US009069395B2

(12) United States Patent
Adan et al.

(10) Patent No.: US 9,069,395 B2
(45) Date of Patent: *Jun. 30, 2015

(54) INPUT DEVICE WITH FORWARD/BACKWARD CONTROL

(75) Inventors: Manolito E. Adan, Woodinville, WA (US); Todd E. Holmdahl, Bothell, WA (US); Michael R. Hooning, Seattle, WA (US); Steven T. Kaneko, Seattle, WA (US); Terry M. Lipscomb, Bellevue, WA (US); Robert Scott Plank, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 467 days.

This patent is subject to a terminal disclaimer.

(21) Appl. No.: 12/696,982

(22) Filed: Jan. 29, 2010

(65) Prior Publication Data

US 2010/0127985 A1 May 27, 2010

Related U.S. Application Data

(63) Continuation of application No. 09/998,305, filed on Dec. 3, 2001, now Pat. No. 7,656,389, which is a continuation of application No. 09/153,148, filed on Sep. 14, 1998, now abandoned.

(51) Int. Cl.
| | |
|---|---|
| G06F 3/0354 | (2013.01) |
| G06F 3/038 | (2013.01) |
| G06F 3/03 | (2006.01) |

(52) U.S. Cl.
CPC .............. G06F 3/038 (2013.01); G06F 3/0312 (2013.01); G06F 3/03543 (2013.01)

(58) Field of Classification Search
CPC ... G06F 3/038; G06F 3/03543; G06F 3/0312; G06F 2203/0333
USPC .......................... 345/156–173; 382/113–114; 715/700–701, 767
See application file for complete search history.

(56) References Cited

U.S. PATENT DOCUMENTS

| | | |
|---|---|---|
| D288,569 S | 3/1987 | Ida |
| 4,862,165 A | 8/1989 | Gart |

(Continued)

FOREIGN PATENT DOCUMENTS

| | | |
|---|---|---|
| CA | 2213954 | 2/1999 |
| DE | 19839390 | 3/2000 |

(Continued)

OTHER PUBLICATIONS

*Armstrong v. Adan* Declaration of Interference filed on May 2, 2008, 7 pgs.

(Continued)

*Primary Examiner* — Kevin M Nguyen
*Assistant Examiner* — Mansour M Said
(74) *Attorney, Agent, or Firm* — Jeremy Snodgrass; Judy Yee; Micky Minhas

(57) ABSTRACT

In a computer system having a display and a keyboard, a computer readable medium includes instructions for invoking a message hook procedure based on a mouse message indicative of a mouse event. Instructions also provide for identifying at least one focus application that has a current keyboard focus and of converting the mouse message into a command for the focus application. The command is then sent to the focus application and the mouse message is prevented from being routed to any other applications. In one embodiment, the commands include the command to page forward or backward through pages of Internet documents. In other embodiments, instead of converting the mouse message into a command, the message hook procedure displays a graphical user interface based on the focus application and the mouse message. The graphical user interface includes one or more commands that the user may select. Based on the selection made by the user, the message hook procedure sends a corresponding command to the focus application.

19 Claims, 13 Drawing Sheets

(56) References Cited

U.S. PATENT DOCUMENTS

| | | | |
|---|---|---|---|
| 4,891,632 A | 1/1990 | Chang | |
| D328,597 S | 8/1992 | Clouss | |
| 5,157,381 A | 10/1992 | Cheng | |
| 5,157,384 A | 10/1992 | Greanias et al. | |
| D330,706 S | 11/1992 | San-Yih | |
| D331,231 S | 11/1992 | Yang | |
| D336,900 S | 6/1993 | Pfeifer | |
| D337,321 S | 7/1993 | Koh et al. | |
| 5,252,970 A | 10/1993 | Baronowsky | |
| D340,923 S | 11/1993 | Tso | |
| D340,926 S | 11/1993 | Lin | |
| D343,392 S | 1/1994 | Harden et al. | |
| D344,498 S | 2/1994 | Leman | |
| 5,287,090 A | 2/1994 | Grant | |
| 5,287,120 A | 2/1994 | Okada et al. | |
| 5,298,919 A | 3/1994 | Chang | |
| D346,373 S | 4/1994 | Grant | |
| 5,313,230 A | 5/1994 | Venolia et al. | |
| D348,057 S | 6/1994 | Bradley | |
| 5,374,942 A | 12/1994 | Gillian et al. | |
| D354,484 S | 1/1995 | Skaggs | |
| D355,901 S | 2/1995 | Bradley | |
| D356,558 S | 3/1995 | Montgomery et al. | |
| 5,428,368 A | 6/1995 | Grant | |
| D362,431 S | 9/1995 | Kaneko et al. | |
| D363,712 S | 10/1995 | Yamada | |
| 5,473,344 A | 12/1995 | Bacon et al. | |
| D368,080 S | 3/1996 | Aeschbacher et al. | |
| D368,900 S | 4/1996 | Ma | |
| D369,593 S | 5/1996 | Ma | |
| 5,530,455 A * | 6/1996 | Gillick et al. | 345/163 |
| D371,771 S | 7/1996 | Verstockt | |
| D372,904 S | 8/1996 | Lo | |
| D373,999 S | 9/1996 | Staats | |
| 5,576,733 A | 11/1996 | Lo | |
| D377,487 S | 1/1997 | Shih et al. | |
| D378,086 S | 2/1997 | Sheehan et al. | |
| 5,635,958 A | 6/1997 | Murai et al. | |
| D381,014 S | 7/1997 | Kraus et al. | |
| 5,648,798 A | 7/1997 | Hamling | |
| D381,968 S | 8/1997 | Edwards et al. | |
| D381,969 S | 8/1997 | Ratzlaff | |
| D381,970 S | 8/1997 | Gasca | |
| D381,971 S | 8/1997 | Wu | |
| D382,550 S | 8/1997 | Kaneko et al. | |
| 5,657,051 A | 8/1997 | Liao | |
| 5,661,504 A | 8/1997 | Lo | |
| D385,542 S | 10/1997 | Kaneko et al. | |
| D385,861 S | 11/1997 | Lin | |
| 5,764,227 A | 6/1998 | Ishimine | |
| 5,784,052 A | 7/1998 | Keyson | |
| 5,805,144 A | 9/1998 | Scholder et al. | |
| 5,828,364 A | 10/1998 | Siddiqui | |
| 5,841,425 A | 11/1998 | Zenz, Sr. | |
| 5,854,624 A * | 12/1998 | Grant | 345/169 |
| 5,883,619 A * | 3/1999 | Ho et al. | 345/163 |
| 5,894,303 A | 4/1999 | Barr | |
| 5,910,798 A * | 6/1999 | Kim | 345/163 |
| 5,912,661 A * | 6/1999 | Siddiqui | 345/166 |
| 5,917,472 A | 6/1999 | Perala | |
| 5,937,419 A | 8/1999 | Oshiro et al. | |
| 5,946,406 A | 8/1999 | Frink et al. | |
| 6,005,553 A | 12/1999 | Goldstein | |
| 6,031,518 A | 2/2000 | Adams | |
| 6,031,522 A | 2/2000 | Strand | |
| 6,072,471 A | 6/2000 | Lo | |
| 6,097,371 A | 8/2000 | Siddiqui et al. | |
| 6,124,846 A | 9/2000 | Goldstein | |
| 6,128,006 A | 10/2000 | Rosenberg et al. | |
| 6,144,372 A | 11/2000 | Chen | |
| 6,163,616 A | 12/2000 | Feldman | |
| 6,166,723 A | 12/2000 | Schena et al. | |
| D436,961 S | 1/2001 | Ledbetter et al. | |
| D437,853 S | 2/2001 | Ledbetter et al. | |
| 6,198,473 B1 * | 3/2001 | Armstrong | 345/163 |
| D442,952 S | 5/2001 | Chang | |
| D443,616 S | 6/2001 | Fisher et al. | |
| 6,256,013 B1 | 7/2001 | Siddiqui | |
| 6,281,882 B1 | 8/2001 | Gordon et al. | |
| 6,300,936 B1 | 10/2001 | Braun et al. | |
| 6,353,429 B1 | 3/2002 | Long | |
| 6,362,811 B1 | 3/2002 | Edwards et al. | |
| 6,396,477 B1 | 5/2002 | Hinckley et al. | |
| 6,417,843 B1 | 7/2002 | Stephens et al. | |
| 6,448,958 B1 | 9/2002 | Muta | |
| 6,456,275 B1 | 9/2002 | Hinckley et al. | |
| 7,002,552 B1 | 2/2006 | McLoone et al. | |
| 7,283,121 B2 | 10/2007 | Adan et al. | |
| 7,639,235 B2 | 12/2009 | Adan et al. | |
| 7,656,389 B2 * | 2/2010 | Adan et al. | 345/163 |
| 2010/0265179 A1 * | 10/2010 | Ram | 345/163 |

FOREIGN PATENT DOCUMENTS

| | | |
|---|---|---|
| EP | 0394614 A | 1/1990 |
| EP | 0 721 170 A1 | 7/1996 |
| EP | 0 901 094 | 3/1999 |
| FR | 2698986 A3 | 6/1994 |
| GB | 2321692 A | 1/1997 |
| JP | 63 282827 | 11/1988 |
| JP | 8-263202 | 10/1996 |
| JP | 8-393620 | 6/2000 |
| WO | WO 92/14235 | 8/1992 |
| WO | WO 97 48066 A | 6/1997 |

OTHER PUBLICATIONS

34 Judgement against Armstrong filed on Nov. 10, 2008, 3 pgs.

U.S. Appl. No. 09/286,739, McLoone et al., (pending).

WACOM Intuos Accessories, printed from http://www.wacom.com/productinfo/accessories.html, three pages, (1998).

Assmann Data Products, "Digitus Magic Click Mouse Data Sheet", Nov. 29, 1994.

Interex Computer Products, "PC Input Devices Data Sheet", Nov. 1994.

Ben Shneiderman et al., "Designing to Facilitate Browsing: A Look Back at the Hyperties Workstation Browser", Hypermedia, Vo. 3, No. 2, (1991), pp. 101-117.

Byrne, Jason, "Unleash the mighty Super Mouse for digital control of numbers and text" Government Computer News, vol. 16, No. 4, (Feb. 24, 1997), 2 pgs.

Rubel, Malcolm C., "Program mouse events into your dBASE apps.", Data Based Advisor, vol. 10, No. 10 (Oct. 1992), 4 pgs.

U.S. Appl. No. 09/286,739, Hugh E. McLoone et al., filed Apr. 6, 1999.

U.S. Appl. No. 10/004,663, Manolito E. Adan et al., filed Dec. 4, 2001.

English Language Search Rpt. for corresponding International Application No. PCT/US99/21160, Date of Mailing: Jan. 11, 2000, 7 pages.

Internet Site, http://www.a4tech.com.tw/2d.html, http://www.a4tech.com.tw/3d.html, http://www.a4tech.com.tw/4d.html, http://www.a4tech.com.tw/4d_track.html, http://www.a4tech.com.tw/4dplus.html, Nov. 13, 1998, 7 pages.

U.S. Appl. No. 29/102,986, Apr. 6, 1999, Ledbetter.

U.S. Appl. No. 29/102,989, Apr. 6, 1999, Ledbetter.

U.S. Appl. No. 09/998,305, Dec. 3, 2001, Adan et al.

Microsoft Announces Microsoft IntelliMouse, Microsoft PressPass-Information For Journalists, http://www.microsoft.com/presspass/press/1996/jul96/Intmspr.mspx, 1996, 2 pages.

Prosecution History for U.S. Appl. No. 11/257,884 including: Final Office Action dated Jun. 28, 2006, Amendment dated Mar. 30, 2006 and Non-Final Office Action dated Dec. 30, 2005, 19 pages.

Prosecution History for U.S. Appl. No. 11/257,878 including: Advisory Action dated Sep. 25, 2006, Response After Final dated Aug. 28, 2006. Final Office Action dated Jun. 28, 2006, Amendment dated Apr. 12, 2006 and Non-Final Office Action dated Jan. 12, 2006, 41 pages.

Prosecution History for U.S. Appl. No. 10/978,937 including: Amendment dated Jun. 15, 2007 and Non-Final Office Action dated Mar. 15, 2007, 20 pages.

(56) References Cited

OTHER PUBLICATIONS

Prosecution History for U.S. Appl. No. 10/004,663 including: Amendment dated May 24, 2006, Non-Final Office Action dated Feb. 24, 2006, Response to Election dated Sep. 30, 2005, Requirement for Restriction/Election dated Sep. 20, 2005, Response to Election dated Nov. 1, 2004 and Requirement for Restriction/Election dated Oct. 1, 2004, 45 pages.

Prosecution History for U.S. Appl. No. 09/996,305 including: Amendment dated Apr. 30, 2002, Non-Final Office Action dated Feb. 27, 2002 and Preliminary Amendment dated Dec. 3, 2001, 32 pages.

Prosecution History for U.S. Appl. No. 09/286,739 including: Amendment dated May 12, 2005. Non-Final Office Action dated Apr. 25, 2005, Appeal Brief dated Jan. 5, 2005, Appeal Brief dated May 21, 2003, Amendment After Final dated Dec. 23, 2002, Final Office Action dated Oct. 22, 2002, Amendment dated Aug. 8, 2002, Non-Final Office Action dated May 8, 2002, Final Office Action dated Nov. 6, 2001, Amendment dated Aug. 23, 2001, Part 1 of 2.

Prosecution History for U.S. Appl. No. 09/286,739 including: Non-Final Office Action dated May 23, 2001, Amendment dated Feb. 26, 2001, Non-Final Office Action dated Dec. 21, 2000 and Preliminary Amendment dated Sep. 20, 2000, 130 pages, Part 2 of 2.

Prosecution History for U.S. Appl. No. 09/153,148 including: Office Action dated Jun. 1, 2001, Amendment dated Nov. 17, 2000, Office Action dated Aug. 29, 2000 and Preliminary Amendment dated Apr. 7, 1999, 47 pages.

* cited by examiner

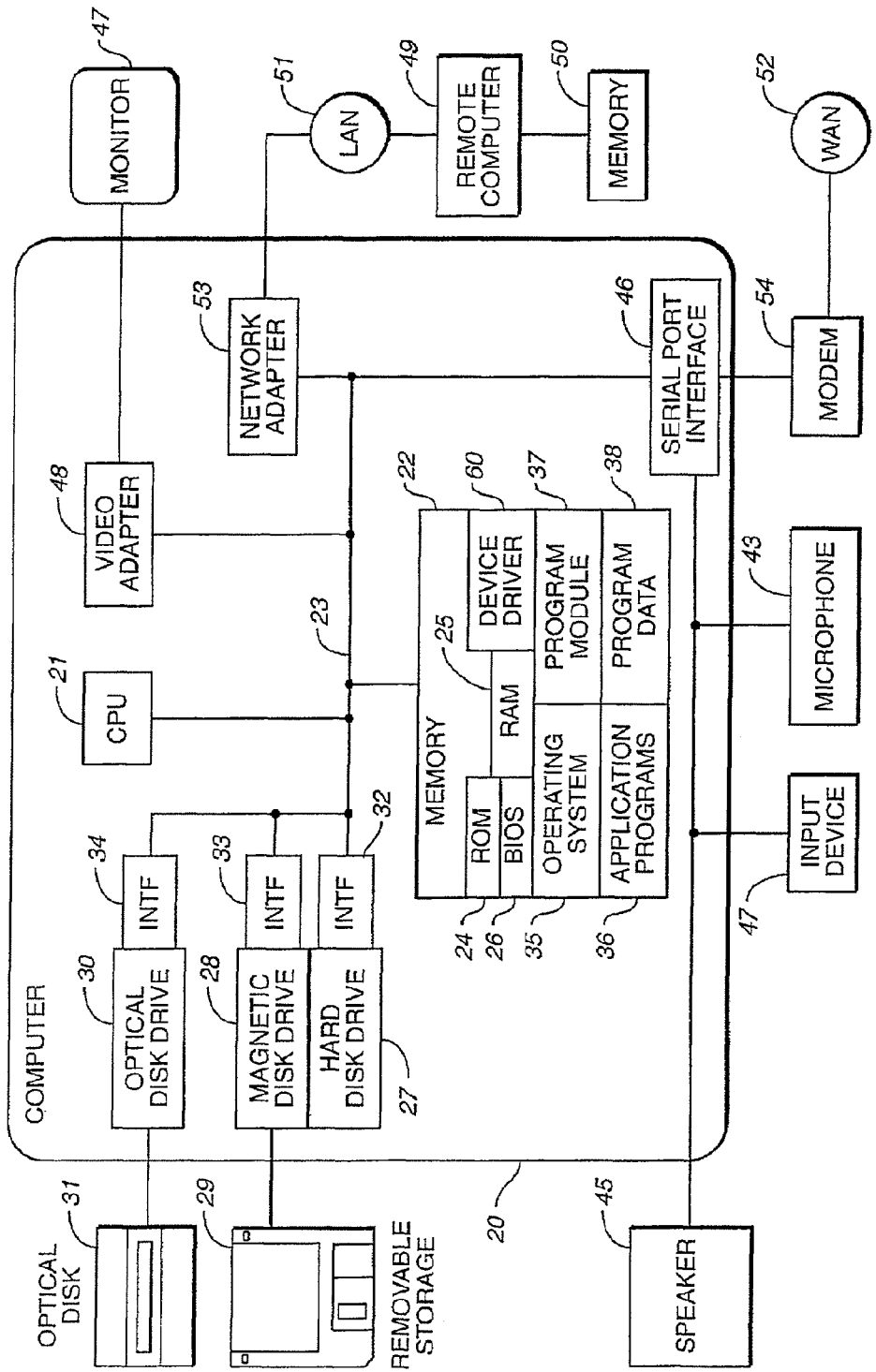
FIG._1

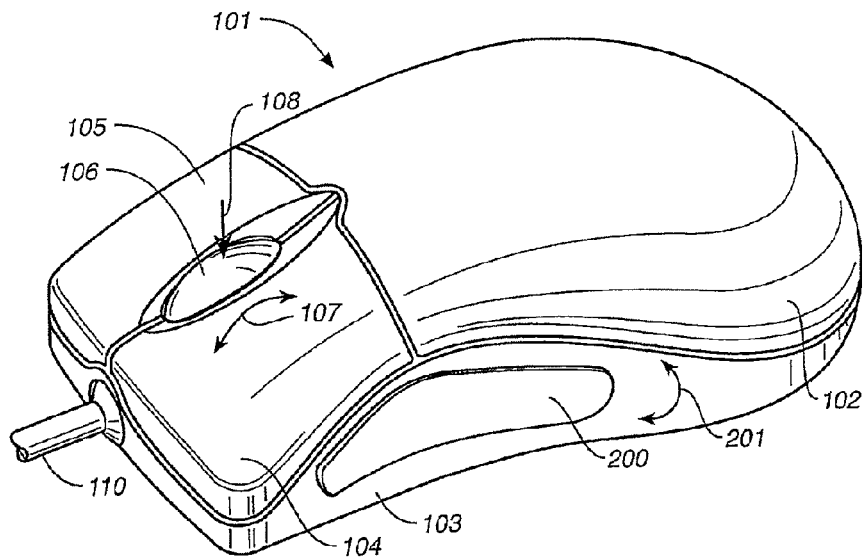
FIG._2A
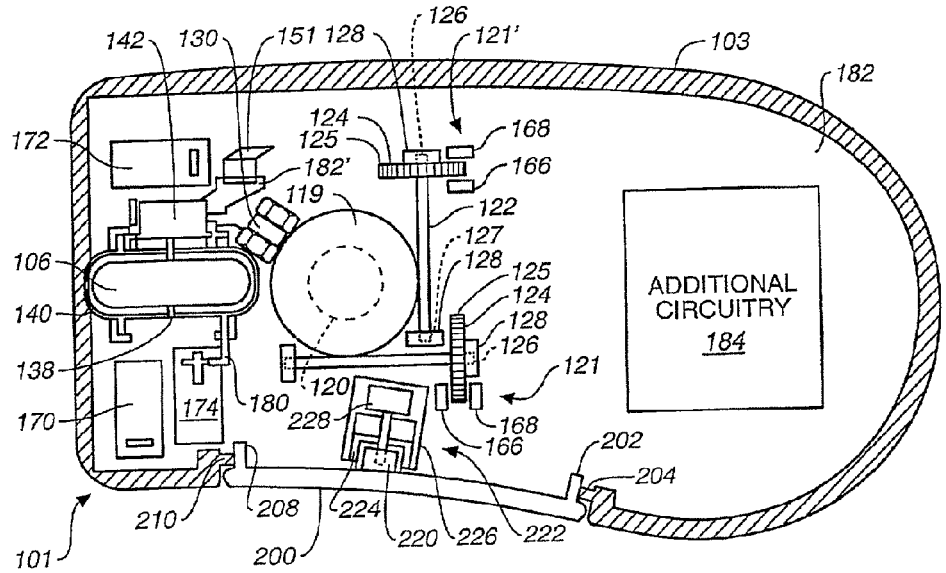
FIG._2B

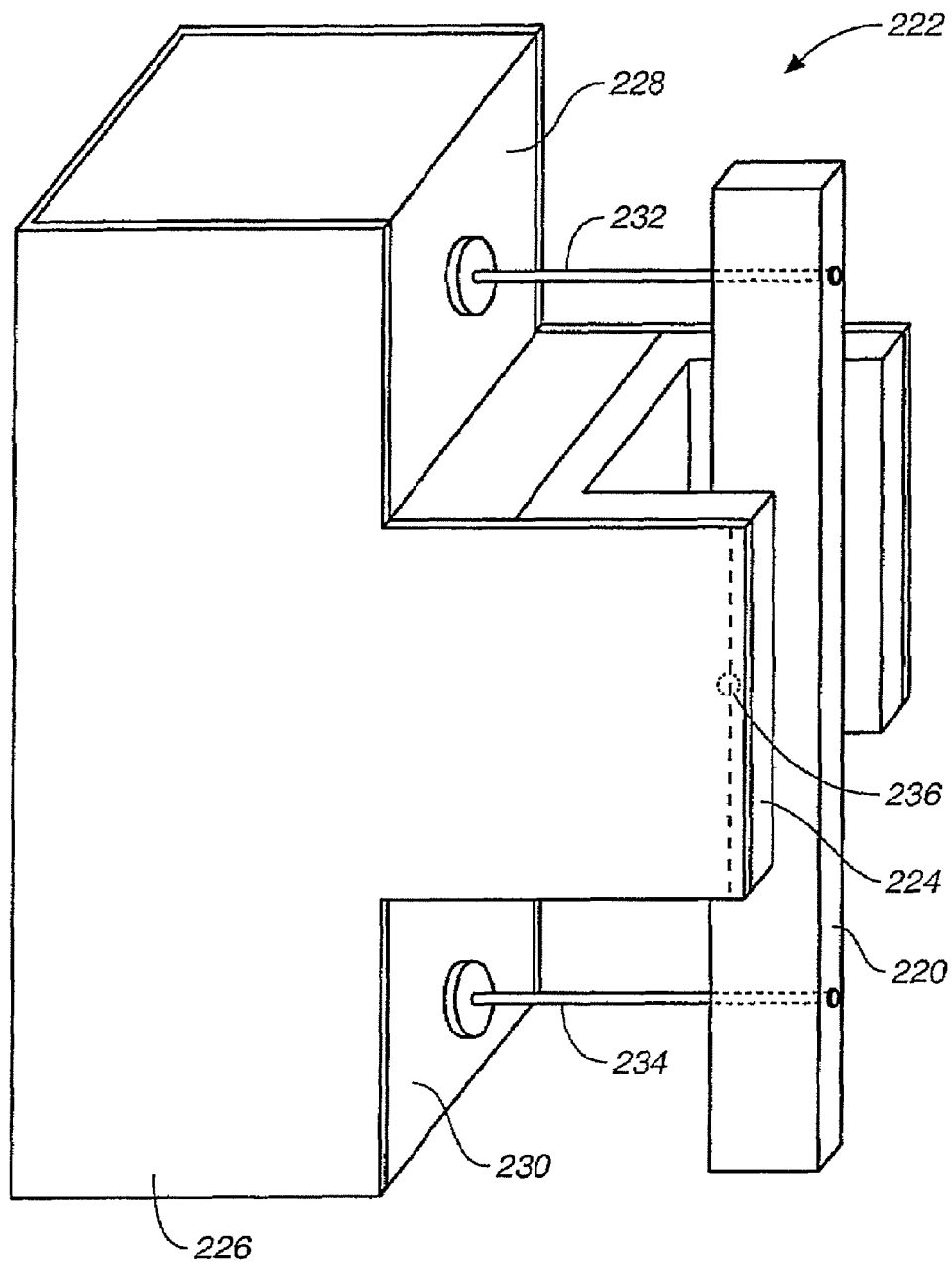
FIG._2C

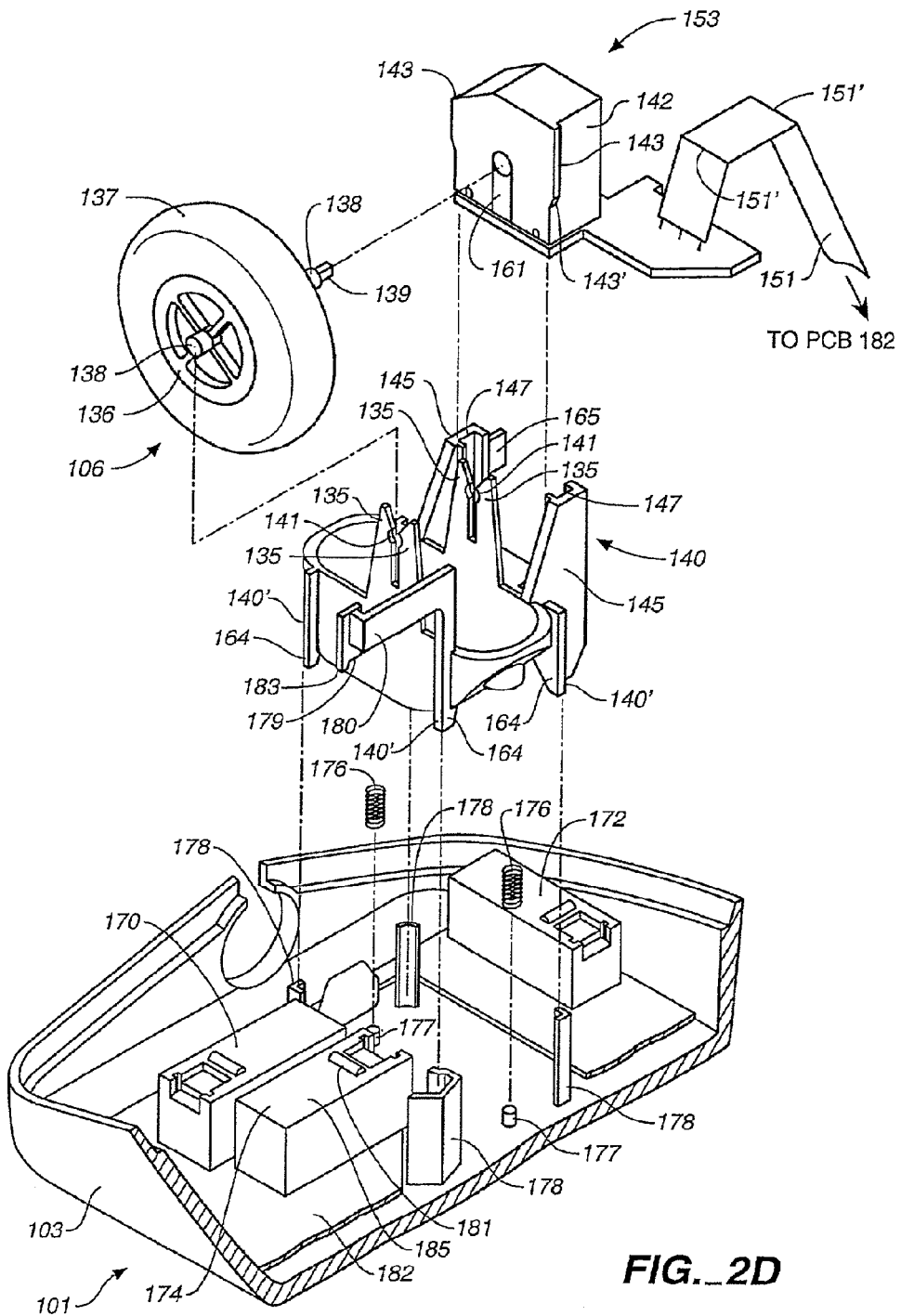
FIG._2D

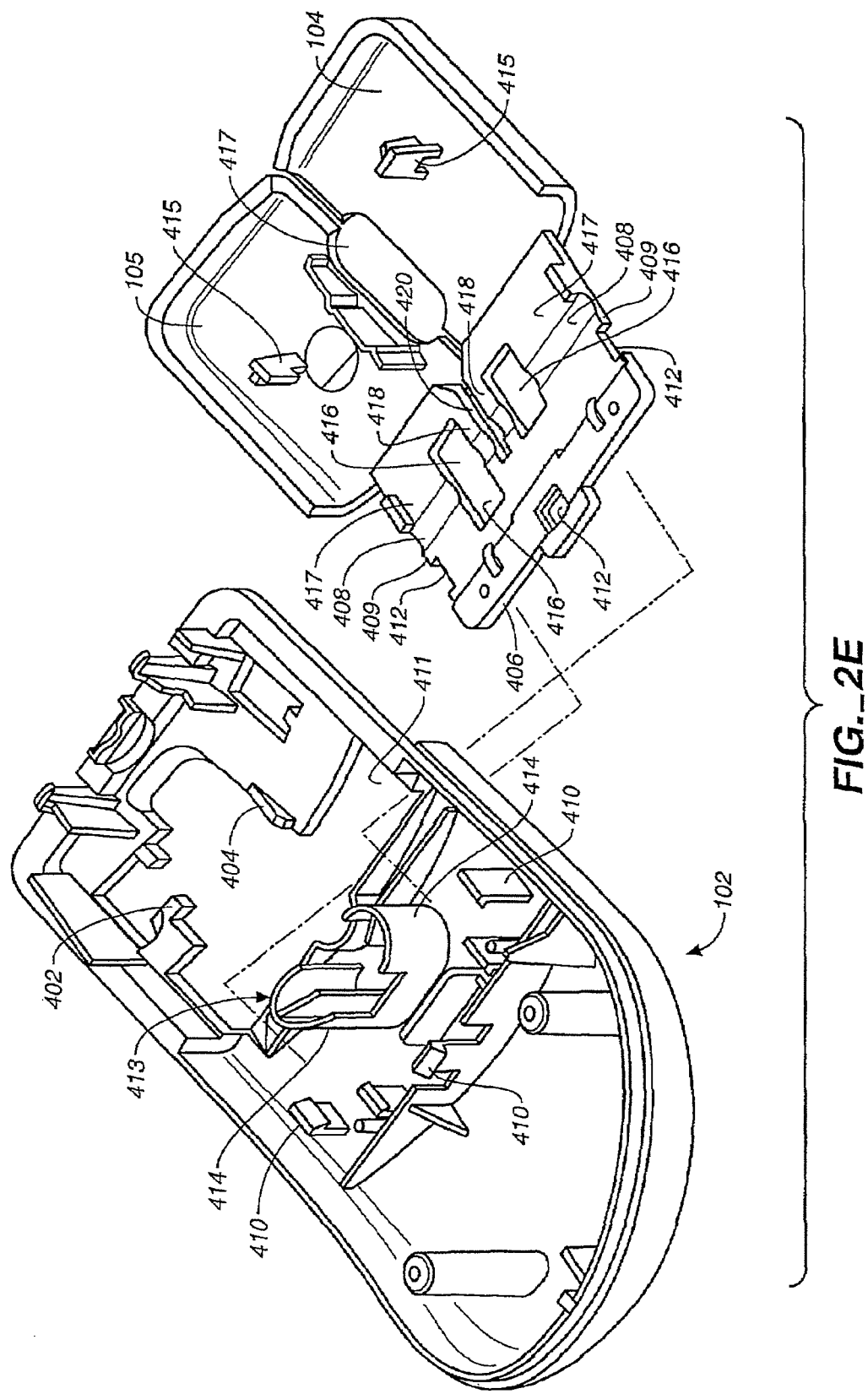
FIG._2E

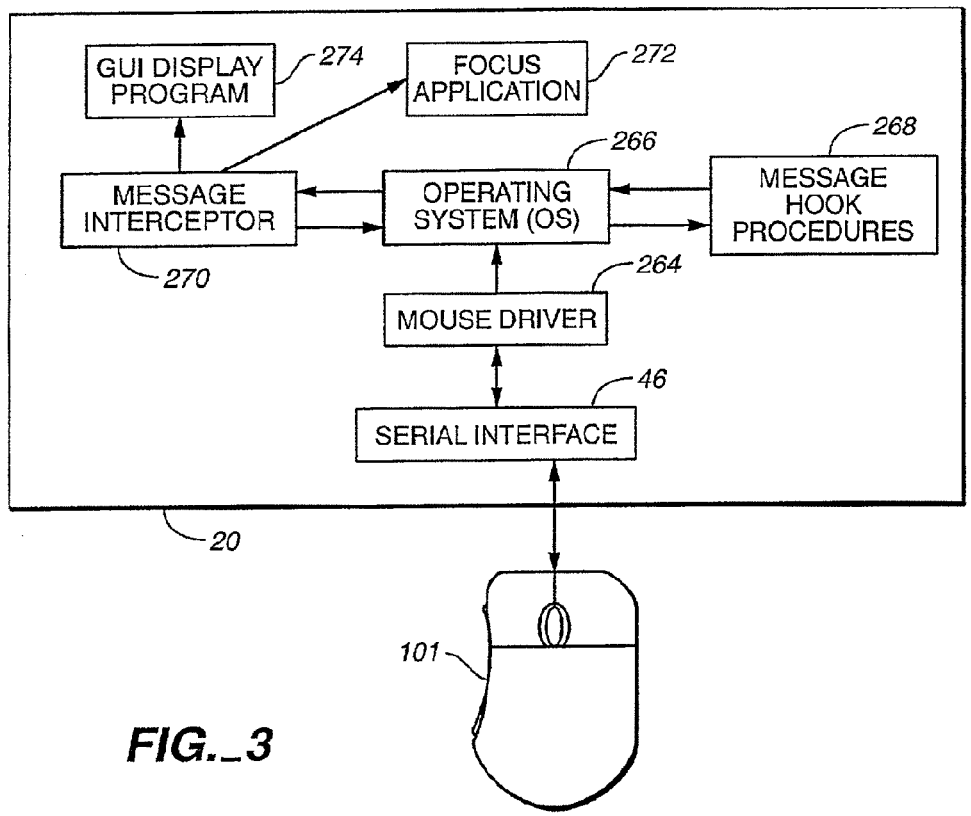
FIG._3
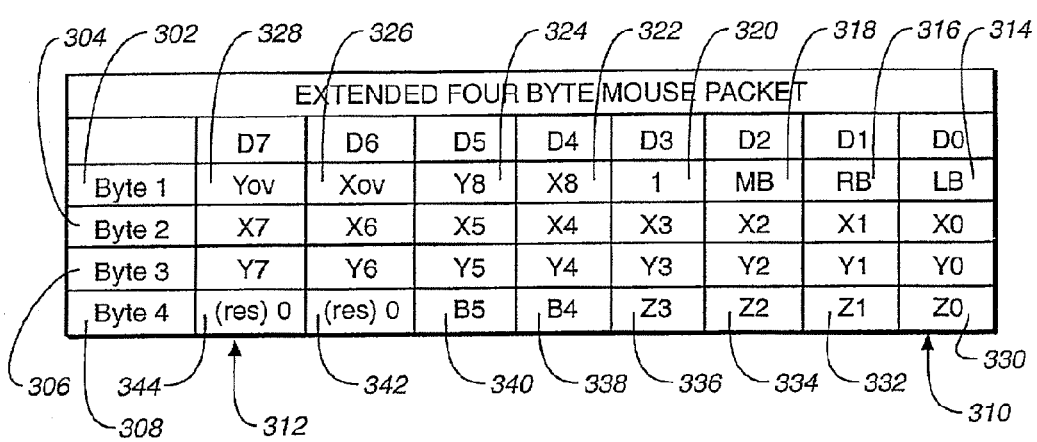
FIG._4

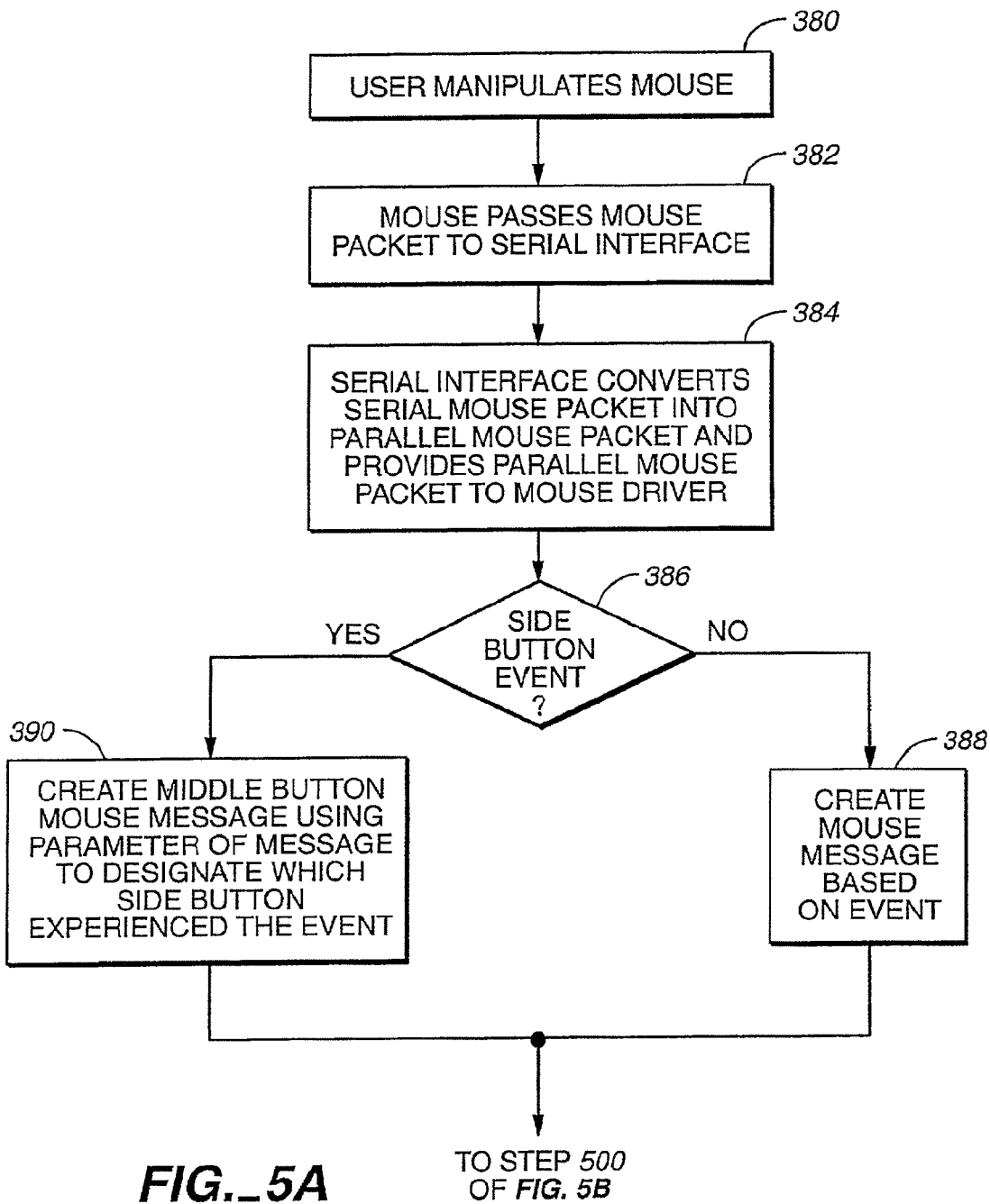
FIG._5A

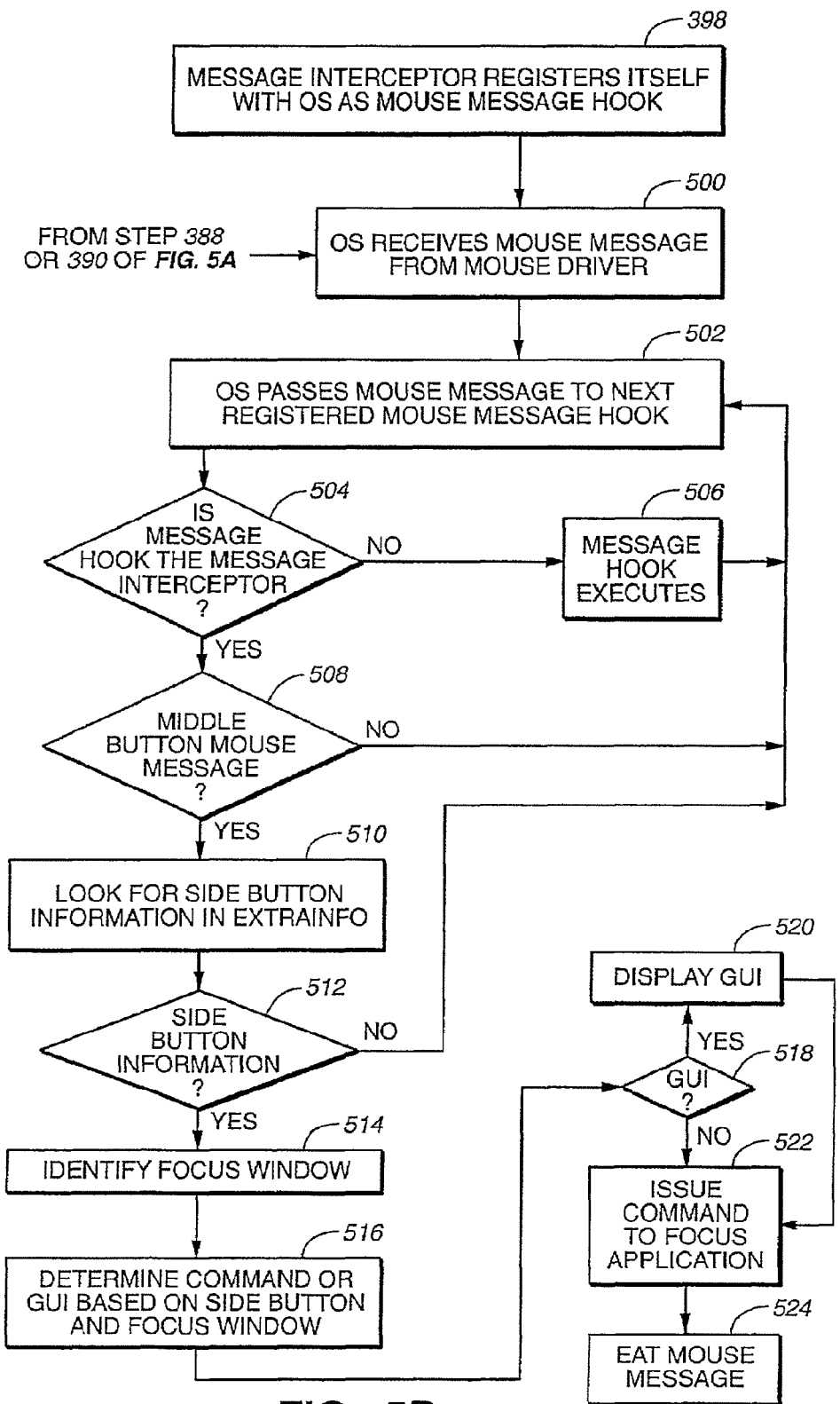
FIG._5B

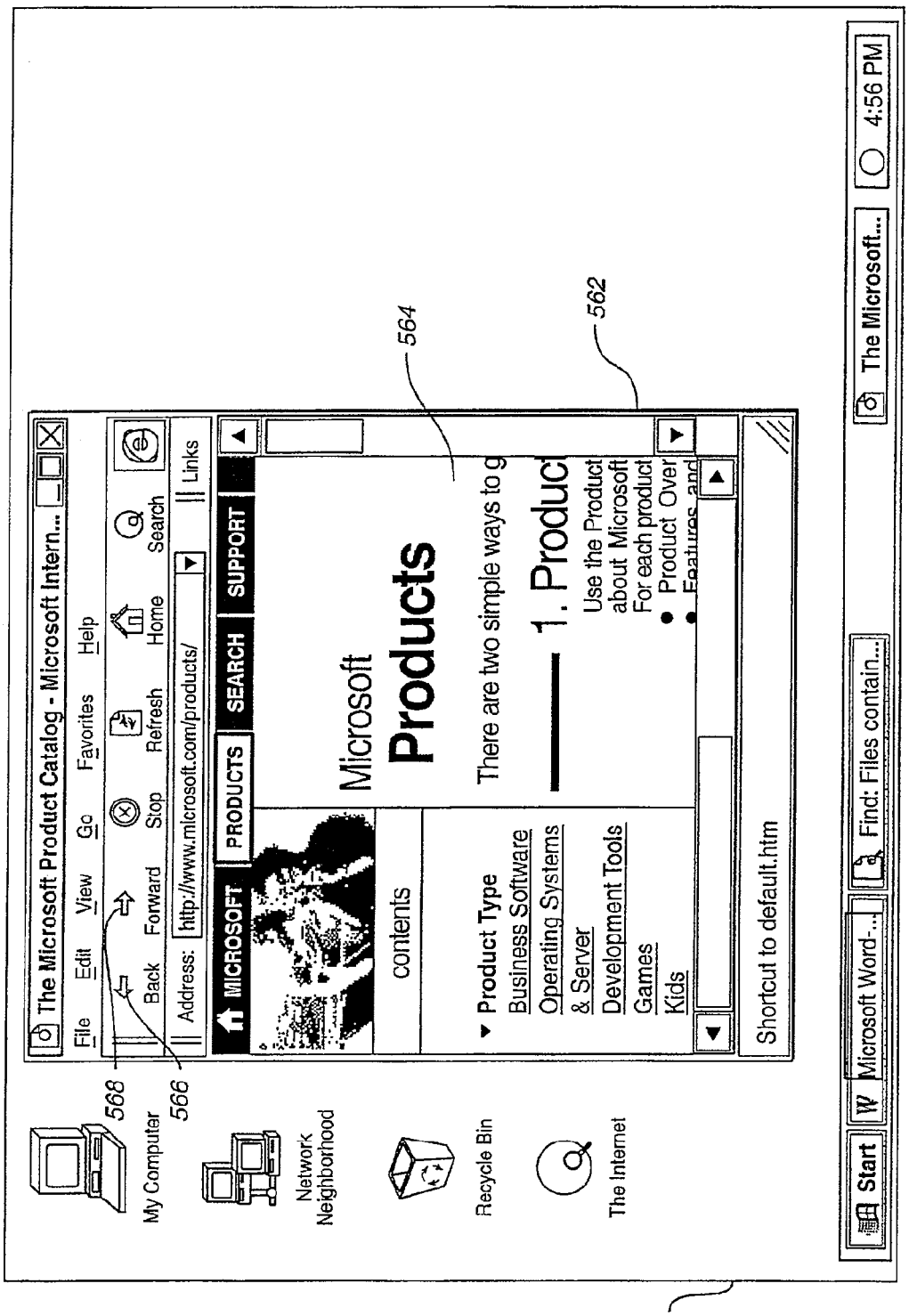
FIG._6A

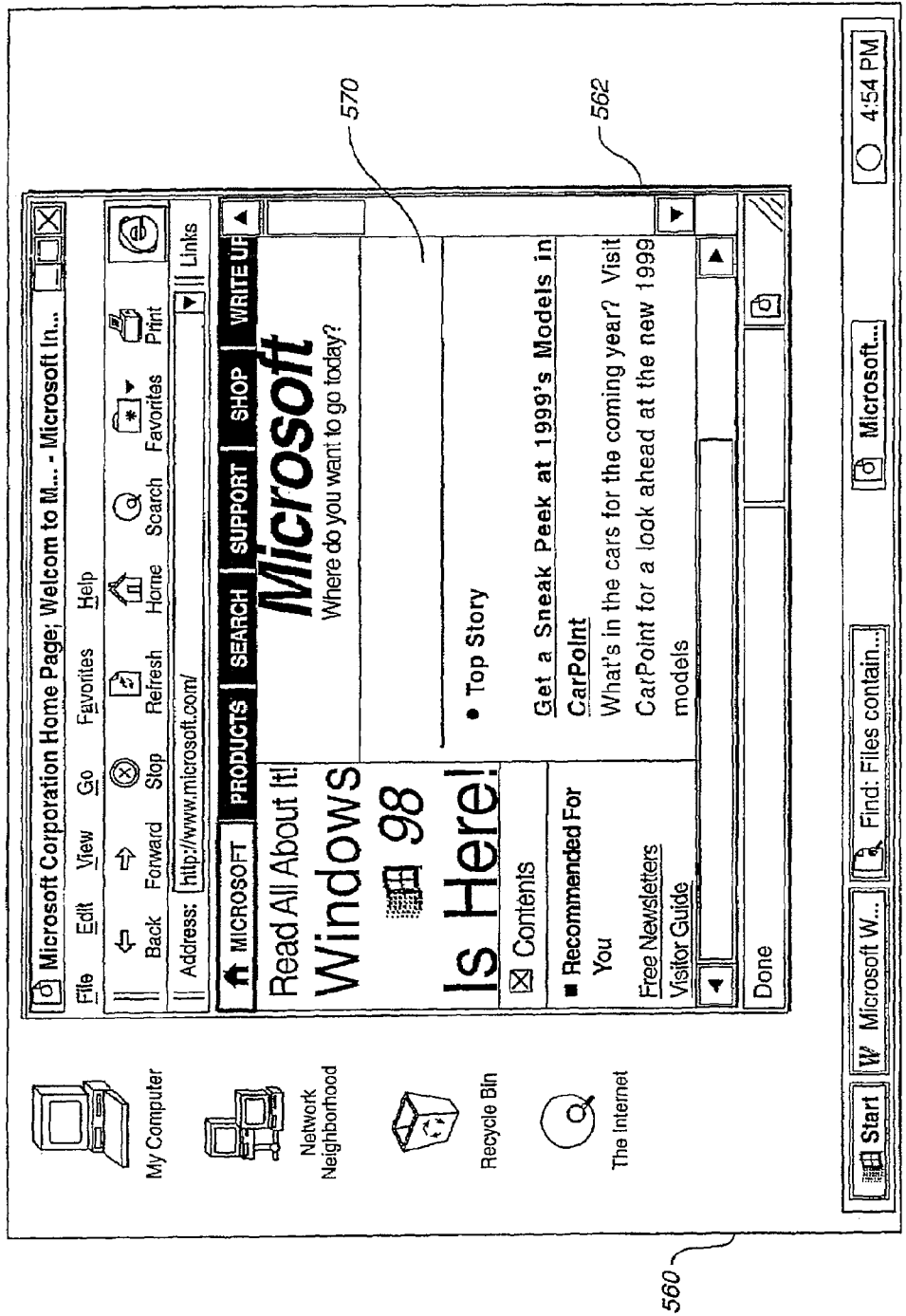
FIG._6B

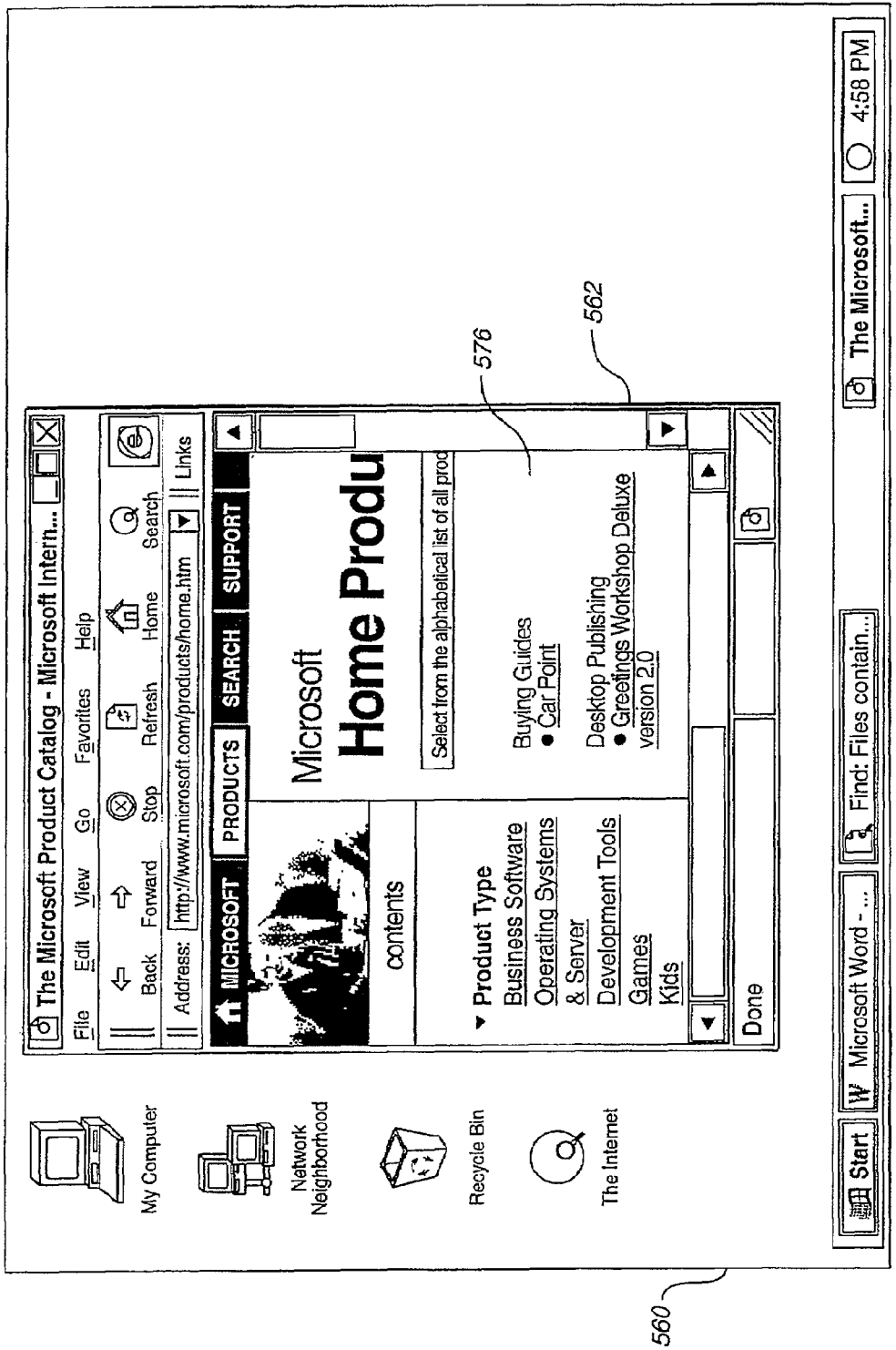
FIG._6C

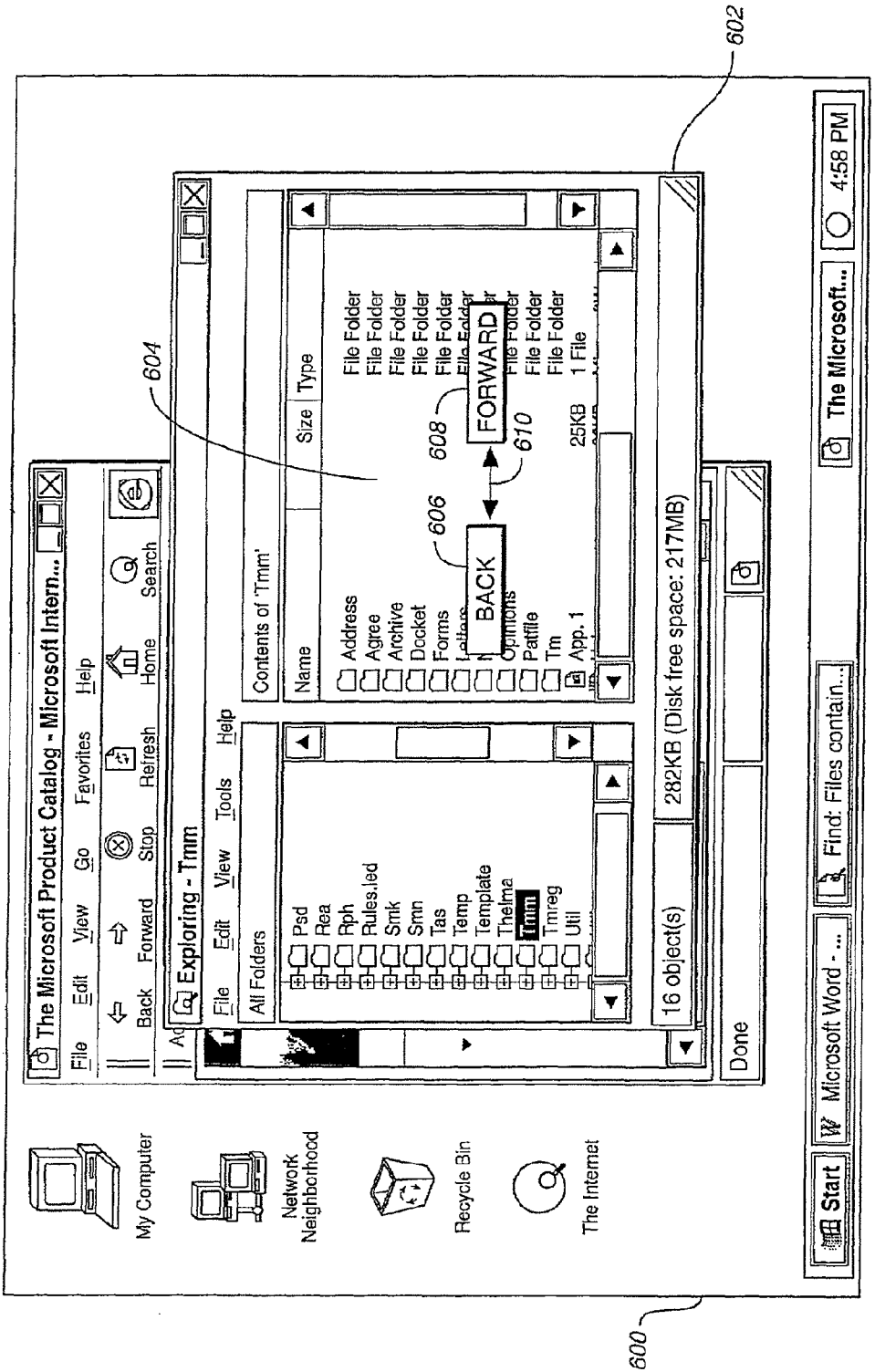
FIG._7A

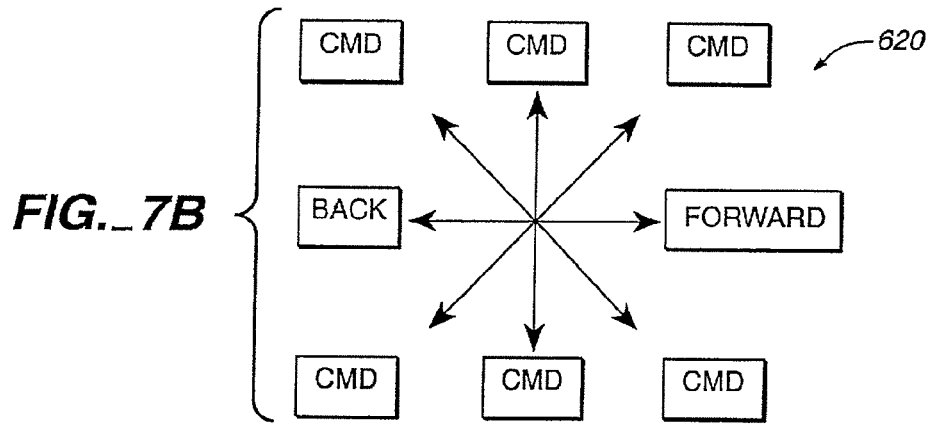
FIG._7B
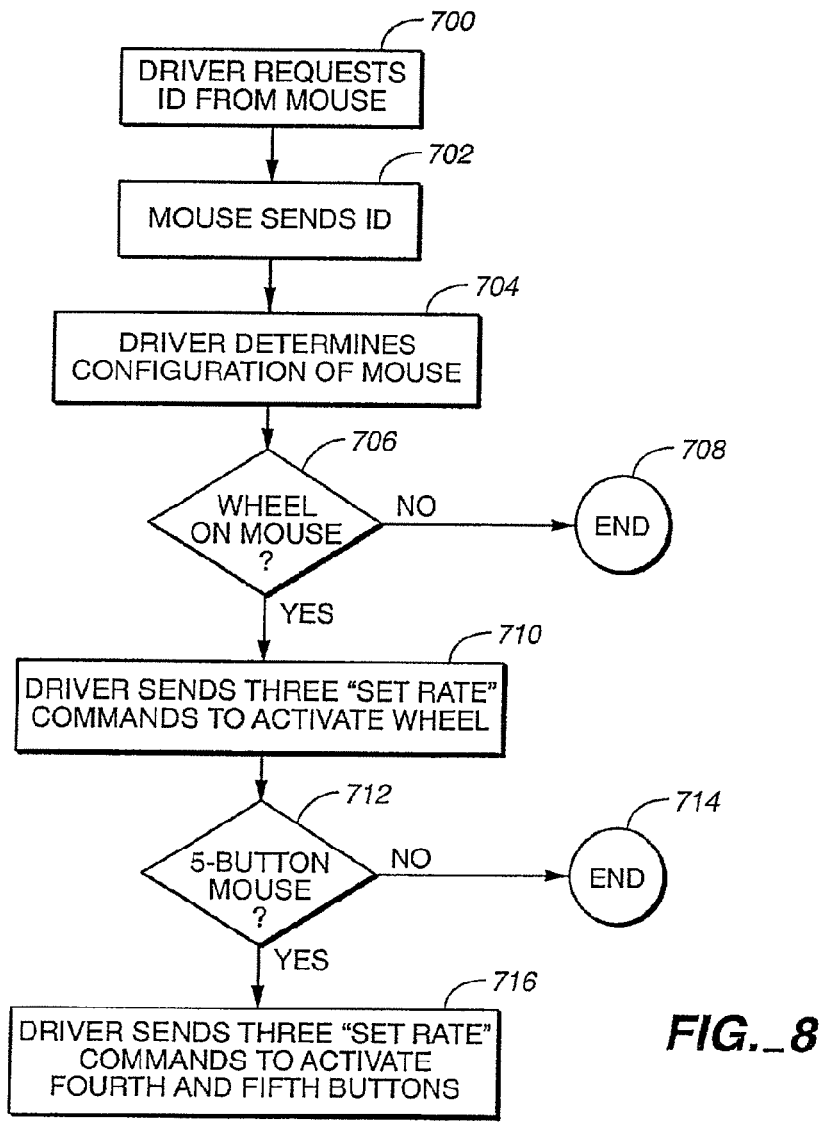
FIG._8

INPUT DEVICE WITH FORWARD/BACKWARD CONTROL

CROSS-REFERENCE TO RELATED APPLICATIONS

This application is a continuation of U.S. patent application Ser. No. 09/998,305, filed Dec. 3, 2001, and entitled INPUT DEVICE WITH FORWARD/BACKWARD CONTROL; which is a continuation of U.S. patent application Ser. No. 09/153,148, filed Sep. 14, 1998, entitled INPUT DEVICE WITH FORWARD/BACKWARD CONTROL, which is abandoned. This application also relates to U.S. patent application Ser. No. 10/004,663, filed Dec. 4, 2001, entitled INPUT DEVICE WITH FORWARD/BACKWARD CONTROL, and which has issued as U.S. Pat. No. 7,639,235; and this application further relates to U.S. patent application Ser. No. 09/152,434, filed Sep. 14, 1998, entitled PROXIMITY SENSOR IN A COMPUTER INPUT DEVICE, and which issued as U.S. Pat. No. 6,456,275; and this application further relates to U.S. patent application Ser. No. 09/152,443, filed Sep. 14, 1998, entitled METHOD OF INTERACTING WITH A COMPUTER USING A PROXIMITY SENSOR IN A COMPUTER INPUT DEVICE, and which issued as U.S. Pat. No. 6,396,477; and this application further relates to U.S. patent application Ser. No. 09/286,739, filed on Apr. 6, 1999, entitled COMPUTER INPUT DEVICE WITH DIGIT SUPPORT AND NATURAL POSITION ACTUATORS, and which issued as U.S. Pat. No. 7,002,552, the contents of each of the above identified applications expressly incorporated herein by reference.

BACKGROUND OF THE INVENTION

The present invention relates to computer systems. In particular, the present invention relates to input devices for computer systems.

In many computer systems, users are able to control functions and select displayed items using a pointing device such as a mouse. Information about the status of a mouse, such as mouse movement and the activation of switches on the mouse, is periodically provided to the computer by the mouse. This information is usually delivered in data packets and is generally received by software programs known as mouse drivers, which provide an interface between the hardware of the mouse and the operating system of the computer. In some systems, when the mouse driver receives a data packet, it generates one or more mouse messages that convey the current status of the mouse including what buttons are depressed on the mouse.

The mouse messages generated by the mouse driver are typically sent to the application that has a display window directly below a mouse cursor, or caret, on the screen. However, in some computer architectures, other applications can receive a mouse message by registering a message hook with the operating system. Under these architectures, the operating system keeps a list of registered message hooks and when the operating system receives a mouse message, it sequentially invokes the message hooks. Each message hook in the list will be invoked unless one of the message hooks consumes the mouse message by returning a value to the operating system that tells the system to stop invoking message hooks in the list and to not send the mouse message to the application that has a window below the mouse cursor.

Currently, mice generally have two buttons or three buttons. Therefore, applications have been written to accept mouse messages indicating events relating to at most three buttons. They generally do not have the ability to deal with any additional button closure events. In light of this, it has not been possible to implement more than three buttons on a mouse in such a way that additional functions can be invoked from currently available applications by depressing one of the additional buttons.

SUMMARY OF THE INVENTION

In a computer system having a display and a keyboard, a computer readable medium includes instructions for invoking a message hook procedure based on a mouse message indicative of a mouse event. Instructions also provide for identifying at least one focus application that has a current keyboard focus and of converting the mouse message into a command for the focus application. The command is then sent to the focus application and the mouse message is prevented from being routed to any other applications.

In one embodiment, the commands include the command to page forward or backward through pages of Internet documents.

In other embodiments of the present invention, instead of converting the mouse message into a command, the message hook procedure displays a graphical user interface based on the focus application and the mouse message. The graphical user interface includes one or more commands that the user may select. Based on the selection made by the user, the message hook procedure sends a corresponding command to the focus application.

BRIEF DESCRIPTION OF THE DRAWINGS

FIG. 1 is a plan view of an operating environment for the present invention.

FIG. 2A is a perspective view of a five switch mouse of the present invention.

FIG. 2B is a top view of the internal circuitry and bottom housing of the mouse of FIG. 2A.

FIG. 2C is a perspective view of a rocker-arm switch of the mouse of FIG. 2A.

FIG. 2D is a perspective cut-away view of the forward part of the mouse of FIG. 2A.

FIG. 2E is a bottom view a top housing of the mouse of FIG. 2A.

FIG. 3 is more detailed block diagram of the computer system of FIG. 1.

FIG. 4 is a data structure for a mouse packet of the present invention.

FIGS. 5A and 5B are flow diagrams showing a method of handling mouse information under the present invention.

FIGS. 6A-6C are screen displays produced by an Internet browser under the present invention.

FIG. 7A is one embodiment of a graphical user interface under the present invention.

FIG. 7B is another embodiment of a graphical user interface under the present invention.

FIG. 8 is a flow diagram of a method for one aspect of an embodiment of the present invention.

DETAILED DESCRIPTION OF THE INVENTION

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, one or more device drivers 60, other program modules 37, and program data 38. A user may enter commands and information into the personal computer 20 through input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

FIG. 2A is a perspective view of a mouse 101 capable of being used with the present invention. Mouse 101 includes an upper housing 102, a lower housing 103, a primary button 104, a secondary button 105, a wheel 106, a rocker button 200, and an output cable 110. Rocker button 200 is capable of being rocked in directions 201 into the side of bottom housing 103. Primary button 104 and secondary button 105 are capable of being depressed toward bottom housing 103, and wheel 106 is capable of being rotated in directions 107 and depressed in direction 108.

As shown in FIG. 2B, mouse 101 includes a ball 119 that rests in a middle portion of lower housing 103 and protrudes through a hole 120 (shown in dashed lines) in the lower surface of the mouse. X and Y axis transducers 121 and 121', respectively, translating motion into electrical signals, and each include an encoder wheel shaft 122 and an encoder wheel 124 axially fixed to an end of each encoder wheel shaft 122. The encoder wheel shafts 122 are oriented perpendicular to each other within lower housing 103, and adjacent to the ball 119.

A wheel pin 126 and an end pin 127 (both shown in dashed lines) axially extend from each encoder wheel shaft 122 into a pair of pin holes, formed in a pair of supports 128, to rotatably receive the encoder wheel shaft. Each pair of shaft supports 128 rotatably retains one of the encoder wheel shafts 122. The wheel pin 126 axially extends from the end of the encoder wheel shaft 122 proximal to the encoder wheel 124. The end pin 127 axially extends from the end of the encoder wheel shaft 122 distal from the encoder wheel 124.

A spring-biased roller 130 projects upwardly from and is rotatably retained by the lower housing 103. The spring-biased roller 130 is positioned opposite to an interior angle formed by the perpendicularly positioned encoder wheel shafts 122 and biases the ball 119 into contact with the encoder wheel shafts and toward the interior angle, while allowing the ball to freely rotate, and cause the encoder wheel shafts 122 and the encoder wheels 124 to rotate.

A light-emitting element, such as a light-emitting diode ("LED") 166, is positioned on one side of each encoder wheel 124. A light-detecting element, such as a phototransistor 168, is positioned opposite each LED 166 on the other side of each encoder wheel 124. As each encoder wheel 124 rotates, light from the LED 166 is alternatively blocked and transmitted through the encoder wheel 124 and received by the phototransistor 168 depending on whether one of several notches 125 in the perimeter of the encoder wheel is positioned between the LED 166 and phototransistor 168.

A primary switch 170 and a secondary switch 172 are positioned below the primary input button 104 and the secondary input button 105, respectively (see FIG. 2A), whereby actuation of the primary or secondary input button results in actuation of the corresponding switch. A roller switch 174 is positioned adjacent to wheel 106, and can be actuated by depressing wheel 106 downwardly as described below.

The switches 170 and 172 are spaced apart in positions approximately within the front left and right corners of the lower housing 103, respectively, to accommodate positioning of the wheel 106 and carriage 140 therebetween. It is desirable to allow a user to depress the primary or secondary buttons 104 and 105 at any portion on the upper surface of these buttons (see FIG. 2A), while still actuating the switches 170 and 172, respectively.

The primary and secondary switches 170 and 172, the roller switch 174, the LEDs 166 and the phototransistors 168 are all mounted on a single printed circuit board 182, and coupled by known means to additional circuitry 184 mounted thereon. Additional circuitry 184 includes a microcontroller and other discrete electronic devices known by those skilled in the relevant art to cause LEDs 166 to emit light, to cause phototransistors 168 to produce signals based on the light, to receive the signals, and to convert these signals to appropriate computer signals to be output over cord 110 to the computer.

Rocker button 200 includes support arms 202 and 208 that have openings used to snap fit rocker button 200 into pins 204 and 210 that are integrally formed in lower housing 103. Support arms 202 and 208 and pins 204 and 210 are positioned such that rocker button 200 can pivot about an axis between pins 204 and 210 in directions 201 shown in FIG. 2A.

Rocker button 200 is in contact with a rocker arm 220 of a rocker arm switch 222. Rocker arm 220 pivots about a connecting pin extending between two arms of a support 224. Support 224 is in turn supported by base support 226, which also supports a first switch 228.

Rocker arm switch 222 is shown in more detail in FIG. 2C, which provides a perspective view of the rocker arm switch. In FIG. 2C, rocker arm 220 is shown connected to switch 228 and a second switch 230 by respective plungers 232 and 234. As button 200 is pivoted, it causes rocker arm 220 to pivot about connecting pin 236 causing either plunger 232 to move into switch 228 or plunger 234 to move into switch 230 and thereby closing the respective switch. Since rocker arm 220 can not close both switch 228 and switch 230 at the same time, the switches are not independently depressible. In some embodiments, switches 228 and 230 include internal springs that open their respective switches when force is not being applied to button 200. Signals from switches 228 and 230 are provided to additional circuitry 184 of FIG. 2B.

In alternative embodiments, rocker arm switch 200 is implemented as two discrete switches. In other embodiments, the orientation of the rocker arm switch or the discrete switches is different.

As shown more clearly in FIG. 2D, wheel 106 consists of a disk 136 having an elastomeric covering 137 extending circumferentially around the disk. A pair of pins 138 forming an axle extending axially from opposite sides of the disk 136. A substantially rectangular cross-section hub 139 extends from one of the pins 138. The pins 138 are snap-fit into a pair of round apertures 141 formed by two pairs of upwardly extending fingers 135 formed in a carriage 140. As explained more fully below, carriage 140 is movably retained in position in lower housing 103.

A pair of vertically extending flanges 143 protrude from opposite sides of an encoder enclosure 142, while a pair of vertically extending ribs 145 protrude from a side of carriage 140. A pair of vertically extending grooves 147 formed in the ribs 145 each receive one of the flanges 143 of the encoder enclosure 142 so that the encoder closure is securely received by carriage 140. When so received, an inverted U-shaped slot 161 in the encoder enclosure 142 is axially aligned with the round apertures 141 of the carriage 140. The flanges 143 each have a tapered lower end 143' to readily allow the encoder closure 142 to be slid into the grooves 147 during manufacture. A flexible web connector 151 electrically interconnects a portion of the Z-axis transducer assembly 153 with the printed circuit board 182.

The carriage 140 rests upon a pair of springs 176. A pair of pins 177, extending upwardly from the lower housing 103, extends through and retains a lower portion of springs 176. Four vertical guides 178 (having a substantially 45° angular cross-section) extend upwardly from the lower housing 103 to slidably retain four corners 140' of the carriage 140 and thereby allow the carriage to slidably rest upon springs 176, while restricting movement of the carriage to sliding movement in a vertical direction.

As a result, the wheel 106 can be depressed and the carriage 140 thereby slid downwardly toward the lower housing 103 of the mouse 101 so that a switch engagement arm 180 extending from the carriage (opposite the encoder enclosure 142) is moved downwardly to actuate the roller switch 174. In particular, a lower end portion 179 of the switch engagement arm 180 engages and depresses a switch button of the roller switch 174, until a lower surface of a downwardly extending stop portion 183 of the switch engagement arm engages an upper surface 185 of the roller switch 174 to limit downward movement of the switch engagement arm (and therefore prevent further downward movement of the switch button 181). Without the stop portion 183, the switch button 181 of the roller switch 174 might be depressed inwardly too far, causing the button to become stuck in the downward position.

Additionally, carriage 140 can be depressed downwardly to actuate the roller switch 174, while wheel 106 is rotated. Therefore, the user can depress and hold the roller switch 174, thereby generating a switch signal, while simultaneously rotating the wheel 106 to generate roller position signals.

Several legs 164, extending downwardly from carriage 140, rest against an upper surface of the lower housing 103 when the wheel 106 is fully depressed, to thereby restrict further downward movement of the carriage. A tab 165, extending outwardly from one of the ribs 145 of the carriage 140, and an upper surface of one of the pair of fingers 135 that are opposite the tab 165, rest against stop members 402 and 404, respectively, of the upper housing 102 (FIG. 2D), to thereby limit upward movement of the roller 106 and carriage 140.

Referring to FIG. 2E, which is a bottom view of upper housing 102, primary button 104 and secondary button 105, primary and secondary buttons 104 and 105 are integrally formed with a resilient hinge member 406 extending from a rearward edge of each of the buttons. Hinge member 406 is received through an opening 411 in upper housing 102 and secured thereto by locking tabs 410 which snap-fit into recesses 412 in the hinge member. When the hinge member 406 is retained by the upper housing 102, and the upper housing is secured to the lower housing 103, a pair of switch-actuating plungers 415, one extending downward from each of the primary and secondary buttons 104 and 105, are positioned over corresponding ones of the switches 170 and 172 to engage and depress the switches. When upper and lower housings 102 and 103 are secured together, wheel 106 extends upward through an oval hole 417 formed between primary and secondary buttons 104 and 105 (as shown in FIG. 2A).

A channel 408 extends transversely across the hinge member 406 between the left and the right sides thereof to provide an area where the material (e.g., plastic) forming the hinge member is thinner, and thereby provides a hinge line at which the buttons 104 and 105 pivot when depressed. The hinge member 406 is resilient and provides an upwardly directed return force to return the buttons 104 and 105 to their original position after being depressed. Importantly, a post 413 extending downwardly from the upper housing 102 is split longitudinally with respect to the housing to form left and right post portions 414, with a gap therebetween. The hinge member 406 has left and right post portions 409, each with a resilient, laterally outward primary hinge portion 417 and a resilient, laterally inward secondary hinge portion 418 having a hole 416 therebetween sized to receive a corresponding one of the left and right post portions 414 therethrough when the hinge member is secured to the upper housing 102. By splitting the downwardly extending posts 413 into left and right post portions 414, the left and right secondary hinge portions 418 of the hinge member 406 can extend therebetween and provide an upward return force to the buttons 104 and 105 at a laterally inward side thereof to better distribute the return force applied by the hinge member 406, as will be described below. A longitudinally extending space 420 is provided between the left and right secondary hinge portions 418 to isolate the primary and secondary buttons 104 and 105 so that movement of either button does not cause movement of the other button.

The mouse generates X and Y axis position signals for the computer system generally in a manner typical of most current mice. In operation, mouse 101 is moved or slid along a planar surface, causing the ball 119 protruding through the hole 120 to rotate. As the ball 119 rotates, it rotates the encoder wheel shafts 122 of the X and Y transducers 121 and 121', which, in turn, rotate the encoder wheels 124 fixed thereon. As the encoder wheels 124 rotate, the phototransistors 168 receive pulses of light from the LEDs 166 as the notches 125 sweep past the LEDs. Each phototransistor 168 converts these pulses of light into varying electrical signals, which are input to additional circuitry 184.

The number of transitions between digital "0" and "1" signals detected by additional circuitry 184 indicates the magnitude of mouse travel. Together, determination of direction and magnitude of mouse travel are referred to in the art as quadrature calculation. Quadrature calculation is performed by additional circuitry 184 using known techniques to produce count signals indicating movement of mouse 101 along X and Y axes. The count signals are either positive or negative, indicating movement of mouse 101 in either forward or reverse direction along a particular axis.

Mouse 101 generates Z-axis position signals for the computer system in a manner similar to that for generating X and Y axis signals. The Z-axis transducer assembly 153 of FIG. 2C produces Z-axis signals, which are input to additional circuitry 184. Additional circuitry 184 determines the direction and magnitude of rotation of wheel 106 from these signals using quadrature calculation.

Although mouse 101 has been described in connection with a track ball used to determine movement of the mouse, the present invention can also be used with solid-state mice that detect movement of the mouse by collecting images of portions of the surface over which the mouse travels.

FIG. 3 provides a more detailed block diagram of the interaction between mouse 101 and computer system 20. To better understand the operation of mouse 101 and computer system 20 of FIG. 3, the components of that system will be discussed in connection with flow diagrams of FIGS. 5A and 5B, which show a process of one embodiment of the present invention, and in connection with a data structure shown in FIG. 4.

In FIG. 5A, a process of the present invention starts when the user manipulates mouse 101 at a step 380. Based on this manipulation, mouse 101 generates a mouse packet that is passed to serial interface 264 at a step 382. An example of a mouse packet under one embodiment of the present invention is shown in FIG. 4 as mouse packet 300. Those skilled in the art will recognize that the mouse packet and the serial interface described below are used in PS/2 and serial mouse connections. For USB connections the mouse information is sent to the mouse driver using publicly available USB protocols for mice.

In FIG. 4, four-byte mouse packet 300 is shown in a row and column format with bytes 302, 304, 306, and 308 shown in rows and the individual bits of each of the bytes shown in columns. Byte 302 is the first byte provided by mouse 101, byte 304 is the second byte, byte 306 is the third byte, and byte 308 is the fourth byte. The columns of bits are organized with the least significant bits on the far right and the most significant bits on the far left. Thus, column 310 includes the least significant bits of each of the four bytes and column 312 includes the most significant bits of each of the four bytes.

Within mouse packet 300, first byte 302 includes left button bit 314, right button bit 316, and middle button bit 318. A "1" in left button bit 314 indicates that the left button is depressed and a "0" in left button bit 314 indicates that the left button is not depressed. Similarly, a "1" in right button bit 316 or middle button bit 318 indicates that the right button or the middle button, respectively, are depressed and a "0" in either of these bits indicates that their respective button is not depressed.

Fourth bit 320 of byte 302 is set to one.

Fifth bit 322 of byte 302 is the ninth bit of a nine-bit signed value that is completed by byte 304. The nine-bit value produced by the combination of bit 322 and byte 304 represents the direction and magnitude of movement of the mouse along the X coordinate. Since the nine-bit value is in two's complement format, bit 322 indicates the direction of mouse movement such that if it has a value of "0", mouse movement is in a positive X direction and if it has a value of "1", mouse movement is in a negative X direction.

Sixth bit 324 of first byte 302 is the ninth bit of a nine-bit signed value that is completed by byte 306. The combination of bit 324 and third byte 306 produces a value that indicates the magnitude and direction of movement of the mouse along the Y coordinate. Since this value is a two's complement signed value, bit 324 indicates the direction of movement along the Y coordinate such that if it has a value of "1", the mouse movement is in a negative Y direction, and if it has a value of "0", the mouse movement is in a positive Y direction.

Seventh bit 326 and eighth bit 328 of first byte 302 indicate whether the nine-bit values formed by bit 322 and byte 304 and by bit 324 and byte 306, respectively, have incurred an overflow condition. This occurs when more than nine bits of movement have been detected by the mouse. In this condition, the respective nine-bit value should be set to their maximum magnitude for the direction of movement.

The least significant four bits 330, 332, 334, and 336 of fourth byte 308 represent the direction and magnitude of movement of mouse wheel 106. The value represented by bits 330, 332, 334, and 336 is a signed value wherein a positive value indicates wheel motion toward the user and a negative value indicates wheel motion away from the user.

Bits 338 and 340 are the fifth and sixth bits of byte 308, respectively, and indicate closure of switches 228 and 230, respectively, of mouse 101. Thus, when bit 338 has a value of "1" switch 228 is closed indicating that upper edge of rocker button 200 is tilted in toward switch 228.

Bits 342 and 344 of fourth byte 308 are reserved for later use and are set to zero.

Returning to FIGS. 3 and 5A, when serial interface 46 receives mouse packet 300, it converts the serial information of mouse packet 300 into a set of parallel information and provides the parallel packets to a mouse driver 264 of FIG. 3 at a step 384 of FIG. 5A. At step 386, mouse driver 264 determines if this is a side button event by examining bits 338 and 340 of mouse packet 300. If this is not a side button event, mouse driver 264 creates a mouse message based on the event at a step 388. The creation of the mouse message is identical to the manner in which existing mice create mouse messages for non-side-button events.

If at 386, mouse driver 264 determines that this is a side button event, the process of FIG. 5A continues at step 390 where mouse driver 264 creates a specialized middle-button mouse message. The mouse message is specialized in that one of its parameters includes the identity of the side button that experienced the event.

Under one embodiment, where the mouse driver 264 is implemented with an operating system such as Windows NT™, Windows 95™, or Windows 98™ provided by Microsoft Corporation of Redmond, Wash., mouse driver 264 selects the mouse message from four possible middle-button mouse messages. The four middle-button mouse messages are divided into two types depending on the location of the cursor within a window. If the cursor is located within a non-client area, such as a boarder along the window, or a toolbar, mouse driver 264 generates a "WM_NCMBUTTONDOWN" mouse message when a side button is depressed and a "WM_NCMBUTTONUP" message when a side button is released. When the mouse cursor is positioned over a client portion of a window, mouse driver 264 generates a "WM_MBUTTONDOWN" mouse message when a side button is depressed and a "WM_MBUTTONUP" mouse message when a side button is released.

Each of these four mouse messages includes a pointer to a structure containing a set of parameters associated with the message. One of these parameters is the current position of the mouse cursor on the screen. Another parameter in the structure is a thirty-two-bit value denoted as "Extrainfo". In some embodiments, mouse driver 264 specializes the middle-button mouse message by storing the identity of the side button that was depressed or released.

After mouse driver 264 creates the mouse message at either step 390 or 388, the process of the present invention continues at step 500 of FIG. 5B. At step 500, an operating system 266 of FIG. 3 receives the mouse message from mouse driver 264. In some embodiments, operating system 266 is a Windows NT™, a Windows 95™, or Windows 98™ brand operating system provided by Microsoft Corporation of Redmond, Wash.

In some embodiments, operating system 266 includes a mouse message hook list that identifies a series of mouse message hook procedures 268. When operating system 266 receives a mouse message, it examines its mouse message hook list to determine if any mouse message hook procedures have registered themselves with operating system 266. If at least one mouse message hook procedure has registered itself with operating system 266, operating system 266 will pass the mouse message to the registered mouse message hook procedure 268 that appears first on the list.

Under the present invention, a message interceptor 270 of FIG. 3, which is a message hook procedure developed under the present invention, registers itself with operating system 266 at a step 398 before step 500 of FIG. 5B and before step 380 of FIG. 5A.

Thus, after operating system 266 receives a mouse message from mouse driver 264 at step 500 of FIG. 5B, the operating system passes the mouse message to the first registered mouse message hook procedure at a step 502. If the message hook is not message interceptor 270 at step 504, the called message hook executes at a step 506 and returns a value to operating system 266 that instructs the operating system to pass the mouse message to the next registered mouse message hook. This is shown in FIG. 5B as a return from step 506 to step 502.

If at step 504, the next message hook in the list is message interceptor 270, the process continues at step 508 where message interceptor 270 determines if this is a middle-button mouse message. If this is not a middle-button mouse message, message interceptor 270 returns a value to operating system 266 to indicate that operating system 266 should pass the mouse message to the next message hook in the list. Thus, the process returns to step 502 from step 508.

If at step 508, message interceptor 270 determines that this is a middle-button mouse message, it proceeds to step 510 where it examines the "Extrainfo" parameter associated with the middle-button mouse message. If there is no side button information at a step 512 of FIG. 5B, message interceptor 270 returns a value to operating system 266 to indicate that the operating system should pass the mouse message to the next registered mouse message hook. This is shown in FIG. 5B as a return step 502.

If at step 512, message interceptor 270 determines that the mouse message includes side button information in the "Extrainfo" parameter, message interceptor 270 identifies the current focus window at a step 514. The current focus window is also known as the top window and is the window designated by the operating system to receive keyboard messages indicative of keystrokes made on the keyboard. It is not necessarily the window directly beneath the mouse cursor because the cursor can be placed outside of the window that is currently receiving keyboard information. To make this determination, message interceptor makes a call to an application programming interface (API) provided by operating system 266 that identifies the current focus window.

At a step 516 of FIG. 5B, message interceptor determines the command or graphical user interface that is to be used based on the identity of the side button, the event that occurred with the side button, and the identity of the focus window. This determination can be made with the aid of a database such as an entry in the registry maintained by operating system 266 for operating systems such as Windows NT™, Windows 95™, or Windows 98™. Thus, for the same focus window, the depression of switch 228 of FIG. 2C can have a separate command associated with it than the depression of switch 230. In addition, different focus windows can have different commands associated with the side buttons. For example, for one focus window the depression of switch 228 can be associated with a page back function, while for another focus window the depression of switch 228 can be associated with an "UNDO" function.

In addition, some focus window/side button event combinations are not associated with a command but instead are associated with the production of a graphical user interface that will appear on top of the focus window.

At step 518, message interceptor 270 determines if the current focus window and current side button event are associated with the production of a graphical user interface. If they are associated with a graphical user interface, message interceptor 270 makes a call to a graphical user interface program 274 of FIG. 3 associated with this side button event and focus window. This occurs at a step 520 of FIG. 5B.

If at step 518 of FIG. 5B, message interceptor 270 determines that the current side button event and focus window are associated with a command or after the user selects a command from the graphical user interface displayed at step 520, message interceptor 270 issues the command to the focus window application, which is shown as focus application 272 in FIG. 3. The issuance of this command is shown in step 522 of FIG. 5B. Based on this command, focus application 272 performs a function such as paging back or forward through an Internet document, undoing or redoing a previously performed function, or paging upward or downward within a document. Examples of these functions are described further below.

After message interceptor 270 has issued the command to focus application 272, message interceptor 270 consumes the mouse message by removing the message from the message chain at a step 524. This is accomplished by returning a value to operating system 266 that indicates to the operating system that it should not pass the mouse message to any other message hook procedures or to the Window below the mouse cursor.

Through the process of FIGS. 5A and 5B, the present invention is able to use an additional mouse button to invoke functions in applications that do not directly support such a button. By using an existing mouse packet protocol and existing mouse messages, the present invention is able to make a mouse with more than three buttons functionally compatible with existing applications.

FIGS. 6A, 6B, 6C, shows changes in a display screen that can be achieved using side button 200 of mouse 101 in conjunction with message interceptor 270 of FIG. 3.

FIG. 6A shows a screen display 560 with a window 562 that is produced by an Internet browser, in this case Internet Explorer 4.0™ produced by Microsoft Corporation. Window 562 includes the image of a current Internet page 564 as well as back button 566 and forward button 568.

In the prior art, in order to page backward to a previous Internet document page, the user had to place the cursor over back button 566 and depress and release the left button. Alternatively, the user could simultaneously press the "Alt" key and the left arrow key to cause Internet Explorer 4.0™ to page backward to a previous Internet page.

Under an embodiment present invention, the user simply has to press and release button 200 of mouse 101 so that switch 228 is depressed while window 562 is the focus window of screen display 560. It does not matter where the cursor is currently positioned when window button 200 is depressed and released.

In this embodiment this is accomplished by message interceptor 270, which receives two middle button mouse messages that indicate that switch 228 has been depressed and released. Based on these two mouse messages, and after identifying that Internet Explorer 4.0™ is the focus window, message interceptor 270 determines that this button is associated with a page back function. In order to cause Internet Explorer 4.0™ to execute a page back function, message interceptor 270 posts a series of keyboard messages that falsely indicate that the user has simultaneously depressed the "Alt" key and the left arrow key and then has released both keys.

When Internet Explorer 4.0™ receives these keyboard messages, it interprets them as if the user has actually made these keys strokes. Based on these keyboard messages, Internet Explorer 4.0™ pages backward to the previous Internet document that was shown on display screen 560. An example of this previous document is shown as previous page 570 in screen display 560 of FIG. 6B.

In the prior art, users could also page forward to documents that were initially shown after the current page, but which are no longer in view because the user has paged backward at some point. Under the prior art, the user initiates at page forward command either by positioning the cursor over forward button 568 and depressing and releasing the left button of the mouse or by simultaneously pressing the "Alt" key and the right arrow key.

Under the present invention, the user can page forward to the next Internet page simply by pressing and releasing button 200 such that switch 230 is closed and opened. This causes two mouse messages to be sent to message interceptor 270, which interprets the mouse messages as the depression and release of switch 230. Based on the identity of the switch that was depressed and released and the fact that Internet Explorer 4.0™ is the focus window, under one embodiment of the invention, message interceptor 270 produces a series of keyboard commands that indicate the simultaneous depression of the "Alt" key and the right arrow key followed by the simultaneous release of those keys.

Message interceptor 270 then posts these messages to Internet Explorer 4.0™, which interprets them as actual keystrokes and thus initiates a page forward function. The result of this page forward function is shown in FIG. 6C where forward page 576 is shown in Explorer window 562 of display 560.

Similar commands can be sent to other applications under the present invention. For instance, the depression and the release of switch 228 can be associated with a command to cause an application to undo a previously performed function. For example, the depression and release of switch 228 can be associated with the "undo" function found in Microsoft's word processing program Word™. In such an embodiment, when message interceptor 270 receives a middle button mouse messages indicating the depression and release of switch 228, it post keyboard messages to Microsoft's Word™ application that are interpreted by Microsoft's Word™ application as an instruction to undo the previous performed function. Thus, if the user had mistakenly deleted a word from their document, simply by depressing and releasing mouse button 200 such that switch 228 is depressed and released, they can invoke the "undo" function of Word™ and cause the deleted word to reappear in the document. Furthermore, the present invention can also be used to invoke the "redo" function, which reverses an "undo" function performed earlier. For example this function can be invoked in an embodiment of the present invention when the user depresses and releases mouse button 200 such that switch 230 is depressed and released.

In another embodiment of the present invention, the depression and release of a side button can be associated with a page down function in the focus application such that when the side button is depressed and released the application pages through a multi-page document. In one such embodiment, the depression and release of switch 228 is converted into commands that instruct an application to page up through a document and the depression and release of switch 230 is converted into commands that instruct the application to page downward through the document.

Those skilled in the art will recognize that the present invention is not limited to causing applications to perform the functions described above. Other functions may be implemented with the applications described above. In addition, although the present invention has been described in connection with specific applications, those skilled in the art will recognize that the invention can be used in conjunction with many different types of applications.

FIG. 7A depicts a screen display 600 showing a window 602 and a graphical user interface 604 having a forward button 608, a back button 606, and a double-headed arrow 610. As discussed above, a graphical user interface, such as graphical user interface 604, will be displayed when message interceptor 270 receives a side button mouse event that is associated with a graphical user interface for the current focus window.

In some embodiments, after determining that a mouse event has occurred and that the event is associated with a graphical user interface, message interceptor 270 waits for a period of time to see if it receives a related second mouse message indicating that a related second mouse event has occurred. The first event and the related second event can include many combinations of events. For example, the first event can be the depression and release of a side button on the mouse and the second event can be movement of the mouse or a subsequent depression and release of the side button of the mouse. Alternatively, the first event can be the depression of the side button and the second event can be movement of the mouse or the release of the side button. Note that the first and second events can be any of those discussed above or any other suitable combination of events.

If message interceptor 270 receives a related second mouse message within the set period of time, it examines the position of the mouse cursor found in the two mouse messages. If the mouse was significantly moved to the left between the time of the first event and the time of the second event, message interceptor 270 accesses a database to determine a command to be sent to the focus window. In the example of FIG. 7A, message interceptor 270 would send a command to perform a back function, since the user's movement would have placed the cursor over back button 606 if graphical user interface 604 had been displayed. This command is sent as a series of keyboard messages that are posted to the focus window as discussed above.

If the mouse was moved to the right between the time of the first event and the time of the second event, message interceptor 270 retrieves a separate command for the focus window. In the example of FIG. 7A, message interceptor 270 would send a series of keyboard messages representing a request for a forward function since the user's movement to the right would have placed the mouse cursor over forward button 608 if graphical user interface 604 had been displayed.

Those skilled in the art will recognize that the left and right directions are provided as examples and that message interceptor 270 will also detect up and down movement as well as diagonal movement of the mouse between the time of the first event and the time of the second event.

If the time interval passes without message interceptor 270 receiving a second mouse message indicating that a related second event occurred, message interceptor 270 calls the graphical user interface application associated with the current focus window and the graphical user interface application generates the graphical user interface. For example, in FIG. 7A, the graphical user interface application produces graphical user interface 604.

When message interceptor 270 later receives a second message indicating that a second event occurred, it passes the coordinates of the mouse cursor associated with the second message to the graphical user interface application. The graphical user interface application then determines what command the mouse cursor was over when the second event occurred. For instance, if the mouse cursor is over forward button 608 when the second event occurs, the graphical user interface application identifies the forward function as the selected command.

The selected command is then returned to message interceptor 270, which converts the command into a format accessible by the focus window or which simply passes the command to the focus window. To perform the conversion, message interceptor 270 can use a database that describes the format for particular commands and focus windows.

Although only back button 606 and forward button 608 are shown in FIG. 7A, those skilled in the art will recognize that the graphical user interface application can produce other buttons. In particular, buttons may be added vertically above and below arrow 610 and diagonally from arrow 610. This results in a radial or pie menu such as pie menu 620 of FIG. 7B. In addition, those skilled in the art will recognize that the size and shape of the buttons can be changed without altering the functions of the present invention.

Although the present invention has been described in connection with mouse 101 having side button 200, those skilled in the art will recognize that the present invention can be practiced with other types of buttons and switches. In particular, rocker arm switch 222 can be replaced by two separate switches that are activated by independent buttons. The switches can also be replaced by touch sensors that are capable of providing an electrical signal indicative of when the user is touching a particular area of the mouse. Examples of such touch sensors are found in a U.S. patent application entitled "PROXIMITY SENSOR IN AN INPUT DEVICE" that was filed on even date herewith, the inventors of which were under an obligation to assign their invention to the first assignee of the present application.

In addition, those skilled in the art will recognize that although the location of button 200 has been referred to as being on the side of the mouse, other embodiments of the present invention place the additional switches or contact sensors at different locations on the mouse. For example, the functionality provided by switches 228 and 230 can be realized by placing touch sensors on top of the left button of the mouse. Under such embodiments, the present invention operates in the same manner except that the two bits in the mouse packet produced by the mouse represent contact with two separate contact strips on the button instead of the depression or release of side switches 228 and 230.

To allow a five-button mouse of the present invention to operate with a number of different drivers, and to allow a driver of the present invention to operate with a number of different mice, the mouse and driver are synchronized to each other when the driver first starts. The steps involved in this synchronization process are shown in the flow diagram of FIG. 8.

The process of FIG. 8 begins at step 700 where the driver requests a mouse identification (ID) from the mouse. At step 702, the mouse returns its mouse ID, which indicates what type of mouse it is. At step 704, the driver uses the mouse ID to determine how many buttons are on the mouse and whether the mouse has a wheel. This information can be stored on the registry or in some other suitable database.

If the mouse does not have a wheel at step 706, the process ends at step 708 with the driver configured to accept data from a mouse that does not have a wheel. If the mouse does have a wheel at step 706, the driver sends a set of three "SET RATE" commands to the mouse at step 710. These commands are combined by the mouse and the combination is interpreted as an instruction to activate the wheel of the mouse by passing wheel data to the driver as the wheel is manipulated.

After step 710, the driver determines if the mouse is a five-button mouse at step 712. If it is not a five-button mouse, the process ends at step 714 with the driver configured for a mouse with a wheel. If the mouse is a five-button mouse at step 712, the driver sends a set of three "SET RATE" commands to the mouse at step 716. These commands cause the mouse to activate its fourth and fifth buttons by passing button data related to these two buttons when the buttons are manipulated.

Although the present invention has been described with reference to specific embodiments, workers skilled in the art will recognize that changes may be made in form and detail without departing from the spirit and scope of the invention.

What is claimed is:

1. A pointing device comprising:
   a housing;
   a plurality of user depressible surfaces; and
   a circuit in communication with the plurality of user depressible surfaces, the circuit configured to:
      generate a first command signal to invoke an undo function to undo a previously performed function based at least on depression of a first depressible surface of the plurality of user depressible surfaces and regardless of a location of a cursor controlled by the pointing device; and
      generate a second command signal to invoke a redo function to reverse an undo function performed previously based at least on depression of a second depressible surface of the plurality of user depressible surfaces and regardless of a location of a cursor controlled by the pointing device.

2. The pointing device according to claim 1, wherein the previously performed function comprises a function of a word processing application.

3. The pointing device according to claim 1, wherein the previously performed function comprises a page navigation function of a network browser application.

4. The pointing device according to claim 1, wherein the previously performed function comprises a file navigation function to navigate a collection of computer files.

5. The pointing device according to claim 1, wherein the previously performed function comprises a folder navigation function to navigate a collection of computer folders.

6. The pointing device according to claim 1, wherein the circuit is configured to generate a third command signal to invoke a browser navigation function within a network browser application based at least on depression of the first depressible surface.

7. The pointing device according to claim 6, wherein the circuit is configured to generate a fourth command signal to invoke a file navigation function to navigate a collection of computer files or folders based at least on depression of the first depressible surface.

8. The pointing device according to claim 1, wherein one or more of the plurality of user depressible surfaces comprises a touch sensor configured to transit a sensor signal to the circuit when a user is touching a particular area of the pointing device.

9. The pointing device according to claim 1, and further comprising:
   an electrical power source to configured to power the circuit, the circuit and the electronic power source being located within the housing.

10. A method of browsing or navigating computer folders and computer file contents using a pointing device and a computer display, the pointing device having a plurality of user activatable buttons, wherein the method comprises:
    in response to depression of a first one of the pointing device buttons sending a page-back signal, regardless of a cursor position on the display, for execution of a page-back function within a focus application, wherein the page-back function comprises paging backward through computer file folders and computer file folder contents; and
    in response to depression of a second one of the pointing device buttons sending a page-forward signal, regardless of a cursor position on the display, for execution of a page-forward function within the focus application, wherein the page-forward function comprises paging forward through the computer file folders and computer file folder contents.

11. The method according to claim 10, wherein the page-back signal causes the focus application to page backward through the file folders to display a previously displayed file folders list or files list.

12. The method according to claim 10, wherein the page-forward signal causes the focus application to page forward through the file folders to display a previously displayed file folders list or files list.

13. The method according to claim 9, wherein the first and second pointing device buttons each comprise a touch sensor.

14. The method according to claim 10, and further comprising:
    in response to depression of the first pointing device button, sending an undo signal for execution of an undo function within a second focus application, wherein the undo function comprises undoing a previously performed function within the second focus application.

15. The method according to claim 14, and further comprising:
    in response to depression of the second pointing device button, sending a redo signal for execution of a redo function within a third focus application, wherein the redo function comprises reversing an undo function performed previously within the second focus application.

16. The method according to claim 10, and further comprising:
    in response to depression of the first pointing device button, sending a second page-back signal for execution of a second page-back function within a second focus application.

17. The method according to claim 16, wherein the second focus application comprises a network browser application, and the second page-back function comprises navigating the network browser application to a previously displayed page.

18. The method according to claim 16, and further comprising:
in response to depression of the second pointing device button, sending a second page-forward for execution of a second page-forward function within a second focus application.

19. The method according to claim 18, wherein the second focus application comprises a network browser application, and the second page-back function comprises navigating the network browser application to a previously displayed page.

* * * * *